United States Patent
Andrews et al.

(10) Patent No.: US 12,274,259 B2
(45) Date of Patent: Apr. 15, 2025

(54) RESILIENT POLYMER HUNTING DECOY

(71) Applicant: Lifetime Decoys, LLC, Austin, TX (US)

(72) Inventors: Peter Andrews, Austin, TX (US); Dane Webb, Austin, TX (US)

(73) Assignee: Life Time Decoys LLC, Austin, TX (US)

( * ) Notice: Subject to any disclaimer, the term of this patent is extended or adjusted under 35 U.S.C. 154(b) by 877 days.

(21) Appl. No.: 16/280,715

(22) Filed: Feb. 20, 2019

(65) Prior Publication Data

US 2019/0254271 A1  Aug. 22, 2019

Related U.S. Application Data

(60) Provisional application No. 62/632,916, filed on Feb. 20, 2018.

(51) Int. Cl.
| | |
|---|---|
| *A01M 31/06* | (2006.01) |
| *B29C 45/26* | (2006.01) |
| *B29C 45/73* | (2006.01) |
| *B29C 45/76* | (2006.01) |
| *B29K 23/00* | (2006.01) |
| *B29L 31/00* | (2006.01) |

(52) U.S. Cl.
CPC ............. *A01M 31/06* (2013.01); *B29C 45/73* (2013.01); *B29C 45/76* (2013.01); *B29C 2045/2683* (2013.01); *B29K 2023/083* (2013.01); *B29L 2031/706* (2013.01)

(58) Field of Classification Search
CPC ........ A01M 31/06; B29C 45/73; B29C 45/46; B29C 2045/2683; B18L 2031/706

USPC .............................................. 43/2, 3; 446/153
See application file for complete search history.

(56) References Cited

U.S. PATENT DOCUMENTS

| | | | | |
|---|---|---|---|---|
| 368,427 | A * | 8/1887 | Ryan ..................... | A01M 31/06 24/1 |
| 430,565 | A * | 6/1890 | Curlin ................... | A01M 31/06 446/222 |
| 1,157,627 | A * | 10/1915 | Koyen et al. ......... | A01M 31/06 43/3 |
| 1,316,566 | A * | 9/1919 | Fauble .................. | A01M 31/06 43/3 |
| 1,392,065 | A * | 9/1921 | Klock ................... | A01M 31/06 43/3 |
| 1,444,342 | A * | 2/1923 | Godward .............. | A01M 31/06 43/3 |
| 1,468,979 | A * | 9/1923 | Sherman ............... | A01M 31/06 43/3 |
| 1,469,188 | A * | 9/1923 | Moore .................. | A01M 31/06 446/222 |
| 1,486,329 | A * | 3/1924 | George ................. | A01M 31/06 43/3 |
| 1,604,615 | A * | 10/1926 | Stoner .................. | A01M 31/06 43/3 |
| 1,617,075 | A * | 2/1927 | Matthai ................ | A01M 31/06 D22/125 |

(Continued)

*Primary Examiner* — Darren W Ark
*Assistant Examiner* — Zoe Tam Tran
(74) *Attorney, Agent, or Firm* — Robert R. Riddle; Jennifer C. Black; Reed Smith LLP

(57) ABSTRACT

A waterfowl decoy comprising a molded body with an interior cavity, a first and second keel, and an opening through the upper side of the molded body and oriented to allow air to pass from the interior cavity through the molded body.

20 Claims, 5 Drawing Sheets

(56) References Cited

U.S. PATENT DOCUMENTS

| | | | | |
|---|---|---|---|---|
| 1,663,009 A * | 3/1928 | Johnson | A01M 31/06 | 43/3 |
| 1,708,762 A * | 4/1929 | Hudson | A01M 31/06 | 43/3 |
| 1,918,874 A * | 7/1933 | Shannahan | A63H 23/10 | 239/211 |
| 2,201,164 A * | 5/1940 | Chester | A01M 31/06 | 43/3 |
| 2,342,107 A * | 2/1944 | Agius | A01M 31/06 | 43/3 |
| 2,391,475 A * | 12/1945 | Newhardt | A01M 31/06 | 446/153 |
| 2,546,189 A * | 3/1951 | Keep | A01M 31/06 | 43/3 |
| 2,651,873 A * | 9/1953 | Risch | A01M 31/06 | 43/3 |
| 2,748,519 A * | 6/1956 | Dennison | A01M 31/06 | 43/3 |
| 2,755,588 A * | 7/1956 | Johnson | A01M 31/06 | 43/3 |
| 2,816,383 A * | 12/1957 | Locher | A01M 31/06 | D22/125 |
| 2,880,544 A * | 4/1959 | Crummer | A01M 31/06 | D11/158 |
| 3,047,972 A * | 8/1962 | Taylor | A01M 31/06 | 43/3 |
| 3,244,680 A * | 4/1966 | Holladay | B29C 55/00 | 528/502 B |
| 3,321,428 A * | 5/1967 | Tordella | C09D 191/08 | 524/488 |
| 3,408,763 A * | 11/1968 | Rudolph | A01M 31/06 | 43/3 |
| 3,492,751 A * | 2/1970 | McInnes | A01M 31/06 | 43/3 |
| 3,704,538 A * | 12/1972 | Gagnon | A01M 31/06 | 43/3 |
| 3,713,250 A * | 1/1973 | Clough, Jr. | A63H 23/00 | 446/155 |
| 3,921,562 A * | 11/1975 | Kelly | B63B 21/66 | 367/106 |
| D268,047 S * | 2/1983 | Fulster | D22/125 | |
| D268,862 S * | 5/1983 | Fulster | D22/125 | |
| D270,656 S * | 9/1983 | Fulster | D22/125 | |
| 4,673,363 A * | 6/1987 | Hudson | B29C 49/20 | 264/516 |
| 5,003,718 A * | 4/1991 | Lenert | A01M 31/06 | 43/3 |
| 5,172,507 A * | 12/1992 | Franceschini | A01M 31/06 | 43/3 |
| 5,207,757 A * | 5/1993 | Franceschini | A01M 31/06 | 43/3 |
| 5,832,650 A * | 11/1998 | Franceschini | A01M 31/06 | 43/3 |
| 6,339,895 B1 * | 1/2002 | Lawson | A01M 31/06 | 43/3 |
| 6,412,209 B1 * | 7/2002 | Kapraly | A01M 31/06 | 43/3 |
| 6,560,912 B1 * | 5/2003 | Achepohl | A01M 31/06 | 43/3 |
| 6,647,657 B2 * | 11/2003 | Igo | A01M 31/06 | 43/3 |
| 7,941,962 B2 * | 5/2011 | Wood | A01M 31/06 | 43/3 |
| 9,635,850 B2 * | 5/2017 | Bourlet | A01M 31/06 | |
| 9,801,368 B2 * | 10/2017 | Lawton, Jr. | A01M 31/06 | |
| 10,986,833 B2 * | 4/2021 | Norton | A01M 31/06 | |
| 11,224,214 B2 * | 1/2022 | Hanson | A01M 31/06 | |
| 2001/0029691 A1 * | 10/2001 | Angelone | A01M 31/06 | 43/3 |
| 2002/0020101 A1 * | 2/2002 | Murray | A01M 31/06 | 43/3 |
| 2002/0178639 A1 * | 12/2002 | Daniels | A01M 31/06 | 43/3 |
| 2003/0061755 A1 * | 4/2003 | McGhghy | A01M 31/06 | 43/3 |
| 2003/0097778 A1 * | 5/2003 | Pippert | A01M 31/06 | 114/294 |
| 2003/0101636 A1 * | 6/2003 | Pippert | A01M 31/06 | 43/3 |
| 2003/0172576 A1 * | 9/2003 | Igo | A01M 31/06 | 43/3 |
| 2006/0242883 A1 * | 11/2006 | Tilby | A01M 31/06 | 43/3 |
| 2007/0266613 A1 * | 11/2007 | Nelson | A01M 31/06 | 43/3 |
| 2008/0263930 A1 * | 10/2008 | Sieman | A01M 31/06 | 43/3 |
| 2009/0126253 A1 * | 5/2009 | Wood | A01M 31/06 | 29/469 |
| 2010/0115819 A1 * | 5/2010 | Sieman | A01M 31/06 | 114/294 |
| 2011/0283591 A1 * | 11/2011 | Sloop | F16M 13/022 | 248/533 |
| 2015/0059229 A1 * | 3/2015 | Miller | A01M 31/06 | 43/3 |
| 2016/0128319 A1 * | 5/2016 | Smart | A01M 31/06 | 43/2 |
| 2016/0143265 A1 * | 5/2016 | Bourlet | A01M 31/06 | 43/3 |
| 2019/0104729 A1 * | 4/2019 | Newman, Jr. | A01M 31/06 | |
| 2019/0254271 A1 * | 8/2019 | Andrews | A01M 31/06 | |
| 2019/0364880 A1 * | 12/2019 | Norton | A01M 31/06 | |

* cited by examiner

RESILIENT POLYMER HUNTING DECOY

CROSS REFERENCE TO RELATED APPLICATIONS

The application is a non-provisional application claiming priority to U.S. Provisional Patent Application No. 62/632,916, filed Feb. 20, 2018.

BACKGROUND

1. Field

The present disclosure generally relates to the field of sporting goods, and more specifically to an improved resilient waterfowl decoy.

2. Description of the Related Art

Decoys in sport hunting, especially waterfowl, are used to attract the game to fly over or land on a particular area of land or water. Most prior art decoys are made of thermoplastic resin. The decoys are rigged often in multiples, with the decoys frequently tethered so as to mimic a group of waterfowl, and thereby increase the likelihood of enticing live animals to the area.

Thermoplastic resin shell decoys (often polyethylene) have disadvantages. Among them, the construction is brittle. Decoys can also be subject to errant shot during hunting. When shot, the effect can range from complete destruction of the decoy to fracturing of various sizes with the resulting holes in prior art decoys allowing the decoys to fill with water and partially or fully sink, ending their usefulness as an effective decoy. The seams that result from thermoplastic construction in existing decoys can fail and allow water to penetrate and likewise partially or fully sink the decoys. Even when the decoy does not sink, thermoplastics are easily marred and damage sustained by the decoys is evident and less likely to entice waterfowl to land. The brittleness of these decoys can lead to failure in a number of other scenarios, including rough handling of the decoys, poor storage, exposure to elements, etc. Moreover, the thermoplastic materials are often subject to UV ray damage, a problem given the outdoor use of decoys.

Multiple prior art decoys rigged together has a number of disadvantages. Decoys are often transported together in various ways, including by using the tether between decoys as a convenient carrying mechanism. The decoys are often needlessly heavy which is compounded when multiples are transported together. Moreover, it is inconvenient to transport multiple plastic shells because in addition to the high weight, the solid hollow body is obtrusively noisy when two collide.

Traditional decoys have a center keel, which has many disadvantages. A single keel design cannot sit flat when the decoy is used on ice or bare ground vertically in a manner that mimics live waterfowl. Second, this center keel frequently is weighted in order for the decoy to be able to right itself when in the water. The fixed weight on the keel is necessarily on the centerline of the decoy, which tends to produce a small righting moment to upright the decoy when it is tipped. The weight is fixed in place and cannot be removed or exchanged, which limits flexibility of the product. The fixed weight not only requires the weight to remain in the decoy during use, which fixes the buoyancy of the decoy and therefore the height at which it sits in the water, but the fixed weight necessarily limits options for transport, storage, and handling, including for instance, the product shipped after manufacture is necessarily the weighted unit, making large orders heavier during transport instead of separated and assembled at the destination.

Moreover, existing decoys are not shaped or weighted properly to behave as a live waterfowl would as floating. In a center keel design, the single keel promotes waterflow around the decoy that resists natural motion that a live waterfowl would make in water. Moreover, because the combination of unnatural shape below water of a center-keel design and a weight distribution that focuses much of the decoy weight in a sub-surface centerline location beyond where a live waterfowl would extend, existing decoys do not sit and behave in the water in a manner similar to live animals.

Moreover, it is thought to be important in attracting waterfowl that the decoys match existing color patterns of the feathers of live waterfowl. Modern decoys vary in quality of paint adherence and often receive paint poorly, fade or discolor when exposed to sunlight, or otherwise are disadvantaged from matching and maintaining a convincing color scheme similar to the live waterfowl. Traditional brittle plastic decoy material is subject to fading in sunlight, adheres to paint poorly, and paint chipping is exacerbated when hard plastic decoys collide. Poorly painted decoys are less effective.

For the above listed reasons, there exists a need for an improved decoy that can solve some or all of the above identified problems while appearing near enough in look and behavior to live waterfowl to effectively serve as a decoy.

SUMMARY

The following is a non-exhaustive listing of some aspects of the present techniques. These and other aspects are described in the following disclosure.

Some aspects include a single-part decoy made of a soft elastic polymer such as an ethylene vinyl acetate (EVA) with a plurality of weighted keels that can perform one or more of the functions of keeping the decoy vertical in the water, providing forward and backward movement of the decoy with little force, allowing for mimicking natural movement in the water, and raising or lowering the profile of the decoy in the water. Some aspects include a hollow body and a ventilation port for use in preventing a vacuum from forming within the inner cavity of the decoy. In certain embodiments, the keels are provided with slots for placement and removal of weights that can be interchanged with weights of other sizes or alternately deployed without weights.

Some aspects include a multiple-part decoy, with the interior shore consisting of a hollow thermoplastic shell, and the exterior consisting of an elastic polymer such as ethylene vinyl acetate (EVA) that is buoyant, partially elastic, non-brittle, and paintable, designed the mimic the size, shape, color and behavior in the water of the subject waterfowl.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
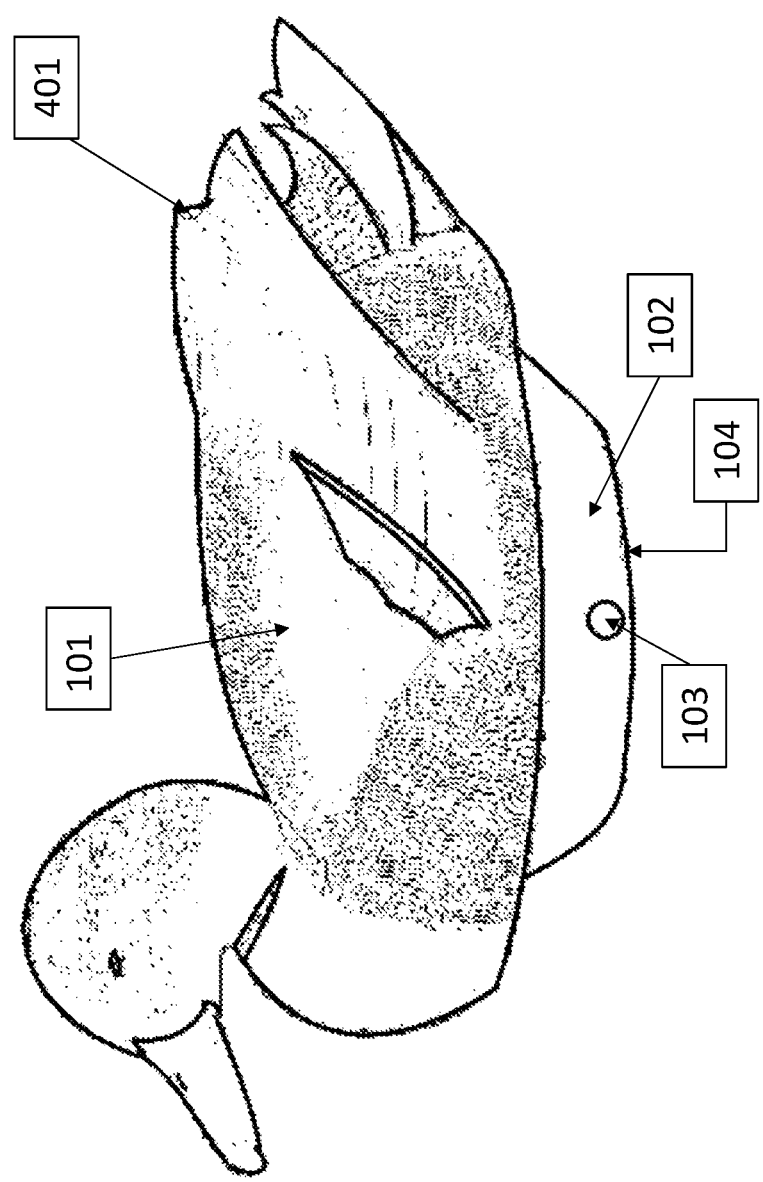
FIG. 1 is a profile view of an embodiment of the polymer exterior of the decoy.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of sporting goods. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional embodiments described herein or provide every benefit described herein. That said, improvements that solve various permutations of these problems are described below.

There are multiple embodiments of the present disclosure. In the preferred embodiment, a decoy mimics the appearance of an animal, here a duck. In its upright position the duck's head faces upward on the fore portion of the body of the decoy and the tail feathers on the aft portion. In this arrangement, the topmost half of the decoy mimics the appearance of the duck and the bottommost portion comprises primarily two keels and an opening to the hollow center interior of the decoy. The keels can each have slots along their approximate midline in which weights can be secured. The keels are each curved, paralleling the outer surface of the body and set inward from the body, yet wide enough to provide an advantageous righting stance in the water. The bottom of the decoy is dominated in appearance by the opening to the hollow portion of the decoy. The opening exposes a hollow area within the decoy and is not visible from the top. In this embodiment, a ventilation port extends outward from the hollow area through the tail feathers to a point above the waterline when the decoy is in water. This allows air to pass through the decoy to avoid vacuum effects in the decoy, subject to temporary beneficial vacuum effects resisting sudden movement as pressure equalizes, discussed below. In the fore portion of this embodiment, an aluminum grommet is included that allows the decoy's rigging to be attached or multiple decoys secured together.

Some embodiments are fabricated from multiple separately manufactured parts, an exterior shell and an interior shore. The preferred embodiment excludes the interior shore in the final product. Instead, the interior shore is a part of the manufacturing process to allow for the creation of an inner cavity of the outer shell, but not for use of the final product.

As shown in FIG. 1, in some embodiments the exterior of the decoy is designed to mimic the size, shape and appearance of a live waterfowl in the manner it would appear while floating on the surface of water, and intended to mimic the slight motion of the waterfowl as it floats. In the preferred embodiment, FIG. 1 shows the profile of the entirety of the decoy. The exterior 101 is fabricated from a light polymer, such as ethylene vinyl acetate (EVA) within a range of 10%-40% weight vinyl acetate. Properties of certain polymers provide advantages and solutions to many problems associated with decoys. The polymer can be light-weight and buoyant. Because the polymer is itself buoyant, it does not rely in being water-tight to remain afloat. Therefore it is not at risk of sinking upon puncture from, for example, errant shot during hunting, from a seam failure, or from any typical impacts that would cause brittle polyethylene products to fail. The polymer including certain species of EVA has an appropriate elasticity and can elongate several hundred percent without breaking, making the decoy highly resilient. These aspects allow rough handling while maintaining the basic function of the decoy and allows for fabrication by molding process, where the decoy can be deformed as it is removed from the mold without damage to the decoy. The polymer exterior can maintain functionality as a decoy despite impacts that would crack or shatter a brittle thermoplastic (e.g., polyethylene) shell.

Certain embodiments utilize the interior shore with the exterior shell. Because the exterior polymer shell is buoyant and not brittle, certain impacts may break the interior shore in those embodiments that have an interior shore or during manufacturing to the extent an interior shore is used in molding, but the decoy does not fail because the exterior still has the appearance of a waterfowl and still would be able to perform as intended. The polymer exterior can maintain functionality as a decoy despite puncture or penetration because it is less dense than water; remaining water-tight or maintaining general water integrity is not integral to its function. The polymer exterior can maintain functionality as a passable decoy despite scraping or scratching from rough handling because its resiliency does not show marks to the extent of thermoplastic resin-based and other existing decoys. The polymer exterior provides the additional benefit of serving to soften and deaden impacts between multiple decoys greatly reducing any noticeable noise, making it more desirable to users.

The EVA or polymer can compress significantly and reform its shape without noticeable damage. This allows accidents with a decoy, e.g., running over it with a car, to not result in any permanent damage unlike traditional thermoplastic decoys.

The polymer, such as EVA, is also optimized to hold and maintain paint colors that can be used to, for example, match the color of existing and target waterfowl. Most versions of polymers considered can take and hold paint without the use of primers. The pliable and soft material resists chipping caused by impact with other objects, including other decoys. Because coloration is important to a decoy's effectiveness, this color fastness extends the useful life of the decoy.

Figure 2:
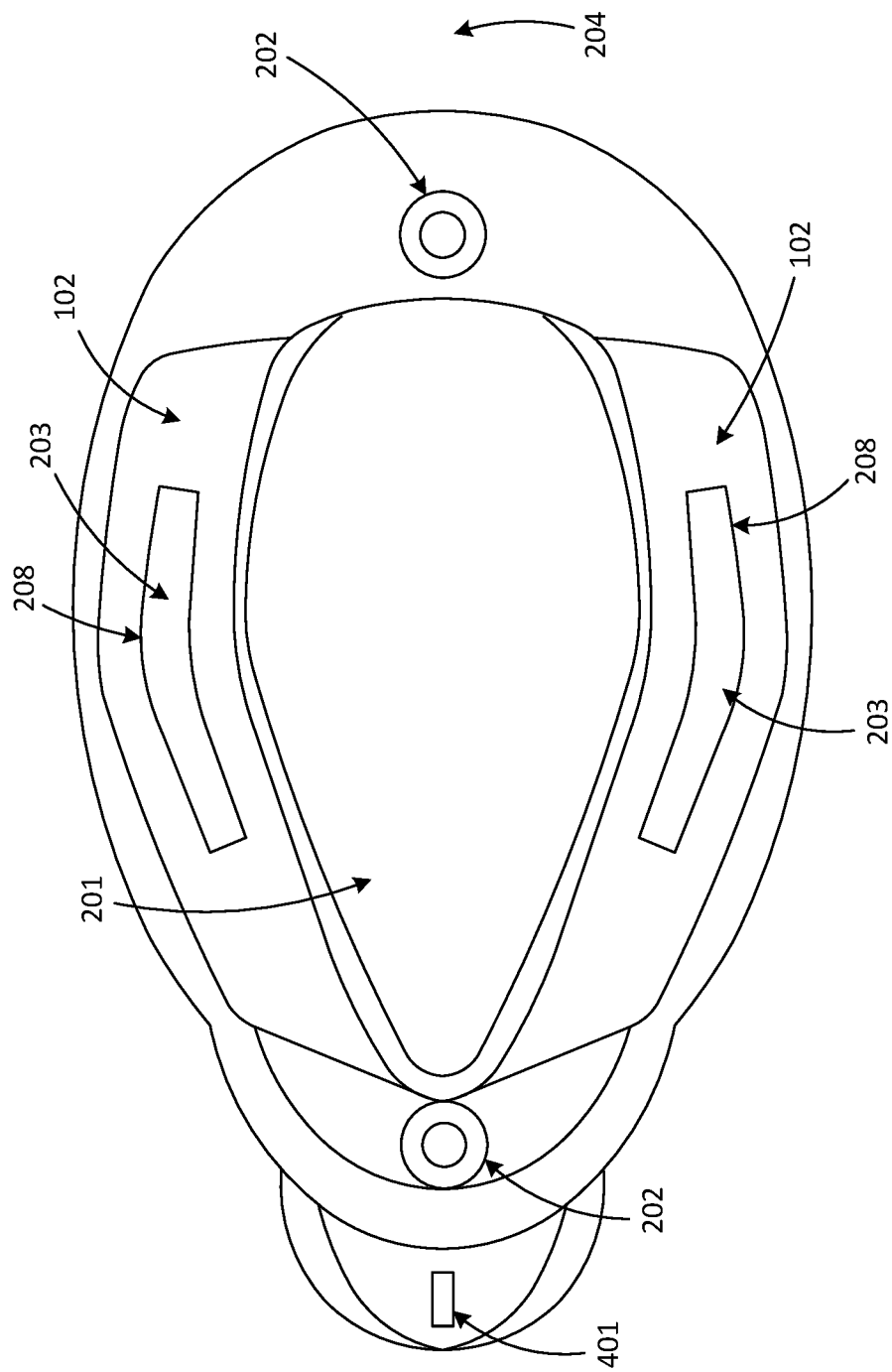
FIG. 2 is a bottom view of an embodiment of the polymer exterior of the decoy.
Figure 3:
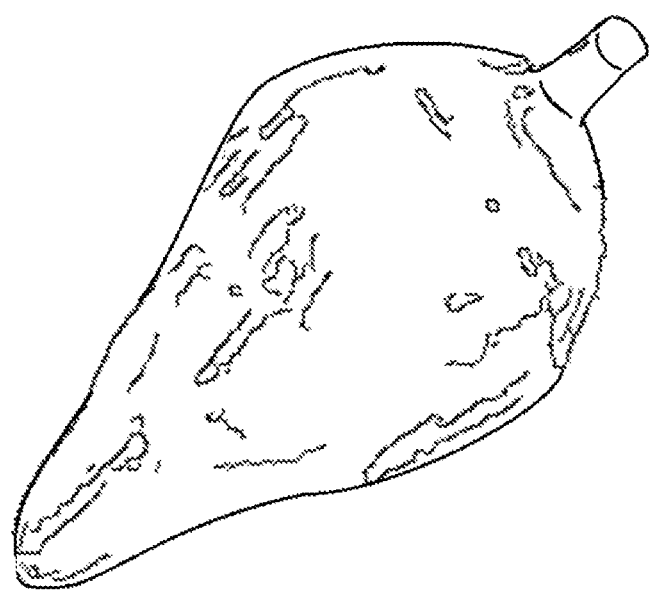
FIG. 3 is an embodiment of the interior shore, usable in certain embodiments of the present disclosure and excluded from certain embodiments of the present disclosure.

As shown in FIG. 2, the polymer exterior shell can be shaped to receive a second section of the decoy, not a part of the final product in the preferred embodiment. This shaping is due to the inclusion of large hollow area 201 within the decoy, accessible from the bottom of the decoy. This second section is typically a hollow interior shore, as shown in FIG. 3. In the molding process used to create many of the embodiments disclosed herein, the newly molded EVA is placed around the shore while it cools. While the material is hot, it is easily deformed. The shore is used to support the decoy until it reaches a hardened state. Because of the stretchable nature of the preferred polymers, the decoy can be stretched and removed from the shore after cooling with no adverse effects to the decoy.

In some embodiments, as shown in the embodiments of FIGS. 1 and 2, the decoy includes an anchor point 202, such as an eyelet which, when the decoy is deployed, remains underwater so as to allow the decoy to be fitted with rigging, which allows the user to fix the decoy in a particular location or to tether multiple decoys together. Because the eyelet 202 is underwater, in some embodiments it is also an appropriate location of a port for molding, because any imperfections in the molding process would not be visible to the waterfowl. Certain embodiments have a grommet opening for rigging or other eyelet. In these embodiments, including the embodiment shown in FIG. 2, the grommet is not the location of the injection port. In many embodiments, a toothed grommet is used which creates a secure grasp onto the preferred EVA. The teeth of the grommet are oriented to face toward the EVA, and the teeth help form a tight clamp on the EVA with limited ability to move or rotate. The metal grommet, which in many embodiments is aluminum, also reduces tearing in the EVA at a high stress point where the rigging pulls on the material.

The exterior shell is particularly suited for construction through injection molding. Polymers such as EVA are appropriate for molding and are well suited to maintain the benefits described herein when molded. In certain embodiments, the mold is created in two pieces, one having one half of the decoy and the other having half the decoy and a portion forming the interior hollow section. In some embodiments, the mold cavity can be created using three pieces, the left side mold, the right side mold and the interior mold. The left side and the right side mold are designed to mimic the appearance of the waterfowl. The interior mold is shaped such that the resulting molded product contains the cavity sized and shaped to fit the interior shore, creating the cavity by the interior mold having a head-and-neck shape. To create the mold cavity the two or three pieces of the mold are placed together, with the left side and the right side around the head-and-neck shaped interior mold, leaving a thin continuous cavity between the interior mold and the exterior left and right mold as an injection port to receive the raw material (e.g., EVA) injected therein. As the raw material is molded and cooled, under this embodiment the left side mold and right side mold are removed which leaves the article fitted around the interior mold. Because of the nature of certain of the polymers used, the material tends to expand when released from compression and cooled. Because of this, the mold is in many embodiments approximately one half the size of the final decoy. Immediately upon opening and the material is free to expand, under the materials used in many embodiments the molded shape will rapidly expand to its final size. Because under the embodiment shown in FIGS. 1 and 2, the exterior shell is designed to partially envelope the interior shore, likewise the exterior shell will partially envelope the interior mold as it cools. Under this embodiment, the interior mold will have a head-and-neck shape, with the article enveloping the head portion. Because of the beneficial properties of the polymers well suited for this application, in particular EVA, are stretchable and resilient, the article can be stretched to demold from the interior mold without damage to the finished exterior shell. In a preferred method of creating the product, a three dimensional rendering of the outer surface of the decoy is made using appropriate computer aided design techniques.

Because this invention is adaptable to a variety of types of waterfowl and other animal and non-animal uses, the three dimensional design is created to mock up the appropriate intended final design. The desired design is used to carve a replica out of a durable material, e.g., wood, for quality control to determine if the CAD design is correct. Upon confirmation of a correct CAD design, that design is carved into a steel mold, comprising two half molds each matching one half of the decoy. The mold design will necessarily include an injection port for the materials to be injected for fabrication. In a preferred embodiment, the injection port is placed along an appropriate location at the bottom of the decoy so that any extra material or imperfection from the injection molding will not be visually apparent to the target animals while the decoy is deployed. It would be recognized that a variety of locations could be appropriate for the injection port, but it is preferable that the port be on a part of the decoy intended to be submerged at deployment to disguise any imperfections caused by the final removal of material at the port. Because of the nature of materials used, e.g., EVA, the steel mold is a fractional size of the intended final product. That fraction is determined by the material properties of the selected material, and with respect to EVA is approximately one-half. The raw material is melted and injected through the injection port to fill the mold, and partially cooled over approximately six minutes. Because the product is not completely cooled at this point, the copolymer has a tendency to deform. To prevent deformation, the molded product is placed over the interior shore to maintain its shape until it cools sufficiently to harden into its final intended shape. In the preferred embodiment, this interior shore is only used as part of the manufacturing process. In other embodiments, this interior shore or a similarly shaped one can be used with the exterior shell. Any excess from the injection port is then removed by any cutting device, e.g., a blade.

As shown in FIG. 3, in some aspects an interior shore can be shaped to fit inside the exterior polymer. This figure shows a top-down view of an interior shore. In the preferred embodiment, this interior shore is a product of the manufacturing process intended to help maintain the desired shape of the decoy body as it cools from the molding process, and is ultimately removed and not used by the customer. The interior shore can be, for example, of hollow thermoplastic construction, such as polyethylene. Even in embodiments where the shore remains with the final decoy, because the shore is partially enveloped by the polymer exterior of the decoy, there is limited to no need to maintain water integrity, maintain color fastness, or be created in a shape that mimics the waterfowl. The interior of the shore can fail entirely and the embodiment would still be a convincing decoy of a waterfowl. Because of this, one aspect of this disclosure is that the interior shore can be of a variety of manufacture determined by any number of factors so long as it can sufficiently withstand the heat of a newly demolded EVA decoy, including availability of materials, quality of materials, cost of materials, toxicity, desirability for multiple or interchangeable uses, ease of mold creation, access to already existing or ease of creation of molds, or other characteristics. This list is not exclusive and is only exemplary of the types of factors that considered in choosing the details of manufacture for the interior shore.

In embodiments in which the shore is a portion of the final product, because the exterior shell, such as is shown in the embodiment of FIG. 1, is resilient and movable, it can be interchanged with successive shores as any shore become unusable or undesirable. In those embodiments in which the shore remains with the exterior shell, if one shore becomes unusable because of damage, a second can be inserted within the shell. This embodiment provides the benefit among other things of allowing a low-cost part to be interchanged while the more sophisticated and likely costly exterior shell is reused. Alternatively, if different shores are desired for different usages, e.g., different weights are appropriate for different water conditions or different riggings, an appropriate shores can be exchanged for the less desirable shore into the polymer external shell. The reverse is also true: a shore can be reused with multiple exterior shells to, for instance, mimic different types of waterfowl or when an exterior shell is damages and needs replacing. In embodiments in which the interior shore is not a portion of the final product, the interchangeability allows a single shore to be used among multiple decoys. The shore can be used to hold the exterior shell while cooling and hardening. The exterior shell can be removed as it hardens, and the shore can be used in any successive decoys.

With reference to FIGS. 1 and 2, there are multiple keels 102 on the bottommost portion of the decoys. On the two keels 102 of the preferred embodiments, there is a slot 208 for attachment of weights 203, such that a large amount of weight of the overall product is concentrated underwater at locations far off the centerline of the decoy. Some aspects of this invention include advantages from the adjustable center of gravity caused by the multi-part construction or optional weight usage to create a decoy with varying righting moments, leading to a "more tender" or "stiffer" decoy, a more stable decoy or a decoy that rolls more with the slight waves, as either is desired by the user. The buoyant force and the center of gravity are generally vertically collinear when the decoy sits resting in the water. As the decoy is perturbed, e.g., via waves or wind, and rolls, the center of buoyancy shifts dramatically in the direction of the roll and a righting moment forms tending to return the decoy upright for most of the likely angles of roll. In those embodiments in which the weights are attached to a lower portion of the decoy, e.g., the keels, the lower center of gravity of the decoy aids in righting the decoy in the water. The buoyant EVA or similar material of the decoy causes the majority of the displacement of water and therefore provides the bulk of the buoyant force. Because of the relatively wide shape of the portion of the decoy that is submerged, the center of buoyancy and center of gravity retain high moments that tend to right the decoy when it tilts. That places the decoy in a stable equilibrium in the water. Because of this arrangement of the weight, if the decoy in this arrangement is tilted off of its vertical axis, the force couple caused by the center of gravity acting downward and the buoyant force acting upward from the center of buoyancy tends to right the decoy. This same righting behavior is seen when the decoy is initially deployed. As the decoy is placed or thrown in water, the force couple caused by the center of gravity being low and distant compared to the center of buoyance causes a rotating moment that tends to right the decoy. The removable nature of the weights allows a user to vary the size of this righting moment (or eliminate it entirely at certain angles), with a larger moment existing with heavier weights and a smaller moment for lower or no weights. This tradeoff is important when considering that certain users can choose to have less of a natural righting moment and instead have a lighter overall product, a large advantage when a user carries dozens of decoys into the hunting area. This unweighted version also floats higher in the water with even less mass, enabling it to move around on top of the water when it is desirable to have more motion in the decoys.

In the embodiments in which different materials are used in the final product, particularly the embodiments with EVA with adjustable weights, the center of buoyance and center of gravity can be dramatically moved. Even in the unweighted version, movement of the centers of mass and buoyancy is possible though typically in smaller amounts than with weight because of the smaller difference in the mass of EVA and thermoplastics. In those versions, the polymers used in the exterior shell, e.g., EVA, are typically lighter per unit height of the decoy than the materials used in the interior shore, e.g., thermoplastics. As a consequence the relative center of buoyancy can shift as different relative proportions of the entire multi-part decoy are the polymer exterior shell. Consequently, the metacenter of the decoy can be altered. This ability to add more weights to the keels or otherwise form the decoy to shift the center of gravity downward relative to the center of buoyancy allows the user to create a decoy that sits stiffer in the water, that is, the decoy has a large righting moment even at small roll angles. Conversely, the user can create a decoy that has a lower metacenter by decreasing or removing the weights or otherwise raising the center of gravity and shorten the metacenter distance. This will allow the decoy to have a smaller righting moment and a resultant long roll period when perturbed. With additional weight, drafts increase and the center of buoyancy will move downward. With less weight, the drafts decrease and the center of buoyancy will move upward. The makeup of the decoy can be adjusted to lengthen or shorten the metacentric height as desired for any useful purpose, e.g., to mimic the motion of waterfowl at rest in the water.

Additional benefits of EVA include its ability to serve to replace what would typically be heavier portions of a decoy, providing certain embodiments of the decoys to be lighter overall, reducing difficulty in transporting and, in combination with EVA' s elasticity, the lightness reduces the likelihood of excessive noise when colliding with other decoys.

In some embodiments, one or more weights are affixed to the underside of the exterior shell below the waterline when the decoy is deployed. Under most embodiments, these weights provide the benefit as described above of increasing the metacenter height, stiffening the decoy in the water, and providing a righting moment when the decoy is on its side or thrown into the water. The weights also help the decoys resist movement from environmental factors such as getting blown around by wind. The weights can be affixed in any suitable manner, such as by waterproof adhesive, and can be of any suitable material, such as lead or lead alloys. In these embodiments, the decoys retain their benefit of deadening noise despite the additional weight because of the light and elastic properties of the copolymer such as EVA used in the exterior shell surrounding the weights. These weights give the decoy the tendency to right itself in the water, both in a rough deployment of the decoy (e.g., simply thrown into the water) and with already deployed decoys reacting to waves and environmental conditions. In certain of these embodiments, the weights can be removed to allow versatile deployment with or without weights, and to allow cleaning, handling and storage in either a weighted or unweighted form. The removable weights allow an owner of multiple decoys to maintain fewer or differently-sized weights to interchange among the various decoys.

In a preferred embodiment, the weights 203 added in each keel 102 are approximately 3.75 ounces each, or 7.50 ounces total, formed by an approximately 3"×1"×½" lead alloy bar. Embodiments with weights weighing between 2 and 8 ounces each suffice for the benefits discloses herein. Two such weights are used in the preferred embodiment. Because the total weight of the decoy is so heavily concentrated in the weights 203 off the centerline 204, each of which are submerged in keels 102, the center of buoyancy and the center of gravity are near each other while the decoy is upright but quickly distant as the decoy rolls, and the resulting metacentric length is high. This creates a "stiff" decoy, which would tend to closely follow waves. In some embodiments, less weight is used to create a shorter metacentric height and make a more "tender" decoy. In most embodiments, the decoy will be considered stiff if each of the weights range from 3 ounces to 8 ounces. In the embodiment shown in FIG. 1, with the weights as described herein and with a EVA construction, the waterline is approximately ½" above the bottom of the body of the decoy, allowing sufficient amount of the decoy to be submerged to both mimic an actual waterfowl's appearance in the water and disguise even in light waves those parts submerged that do not have the appearance of a waterfowl. In this same embodiment and when the decoy is positioned upright in the water, the vertical center of gravity is approximately at the waterline and the center of buoyancy is within ½" of the waterline. The decoy would be functional in a stiff embodiment with the dual-keel design when the center of buoyancy is at a range of ¼" to 2 inches below the center of gravity. The decoy would be in a tender embodiment when the center of gravity is more than 2 inches above the center of buoyancy. In most embodiments, this would require the removal of the weights or substantial repositioning of weights or keels. The stiff embodiment is preferred.

In both the unweighted and the weighted embodiment, the metacenter height is preferably sufficiently large to prevent capsizing the decoy under normal and expected conditions, considering waves and environmental factors such as wind.

In certain embodiments, two keels 102 extend downward from the underside of the decoy. In some embodiments as shown in FIG. 2, these keels 102 extend longitudinally along the underside of the decoy approximately following a curved path approximately parallel with the outer edge of the underside of the decoy. In a typical mallard decoy, the keels 102 have an approximately 7 inch length, one inch width, and one and a half inch height. These dimensions are non-critical and the decoy device will behave similarly with significant changes in these dimensions and are largely dependent on the overall decoy dimensions. In particular, because different decoys are designed to mimic different waterfowl, the dimensions will be constrained at least by the size of the decoy. In preferred embodiments, the keels must be sufficiently large enough to be able to float the keels themselves while holding the weights. If the keels are too thin or small and do not create enough buoyancy to support the added lead weights, then the decoy sits lower in the water and does not look natural. Instead, in those scenarios, it appears to be sinking. The use of dual wide-set keels moves the center of buoyancy dramatically off center when the decoy rolls, increasing the righting moment. Similarly, the wide-set keels aid in righting a decoy that is thrown into place. In a preferred embodiment, the keels at their most distant spot should be no less than three inches apart. The curvature of the keels creates two convex keels. Among the advantages of these keels is that they can serve as a platform on which to mount weights, discussed above. In a preferred embodiment, a cavity 208 in each keel is formed either by molding or tooling out after molding in which the weights 203 can be placed. The weights can be secured in the keels in any number of appropriate manners, including methods that allow for removal of the weights. This can be advantageously accomplished by a variety of appropriate fasteners 103, e.g., sex bolts, binding posts, or Chicago screws, passing through a hole through the keel 102 aligned with a hole in a weight 203. The ease of removal of the described fasteners 103 allows rapid and simple interchange of weights. The keels 102 can be shaped, particularly with respect to the convex nature of the shape, to allow water to cause the decoy to move about the vertical axis in a manner that mimics live water fowl. The oppositely disposed convex shape of the two keels in this embodiment reduces any side-to-side transverse motion while allowing circular yaw motion. The dual keels reduce the front-facing cross section of the decoy in the water; that is, provides for a large metacentric height on rolls without an excessive depth as would be required for the same effect on a single keel design. Because of this reduced cross section, water can more easily flow around the decoy reducing the force necessary to make the decoy move in the water. The reduced submerged cross section combined with the larger cross section above water in a very light weight material results in a design that can move easily above the water due to wind or other light forces and is easier to retrieve or move by pulling on rigging. This ease of movement mimics the movement of live waterfowl. In some embodiments, a dual keel design includes a flat surface 104 on the bottom-side of each keel 102, which allows for the decoy to sit upright when placed on solid surface. This is advantageous when deployed on ice or other solid surfaces, or for storage. Each of the advantages described above are lost in prior art single-keel decoys: they cannot be effectively deployed on a hard surface, they do not have as large a righting moment per unit of depth of the decoy below water, nor do they provide as low a profile in the water are they as easy to move about in the water.

Figure 4:
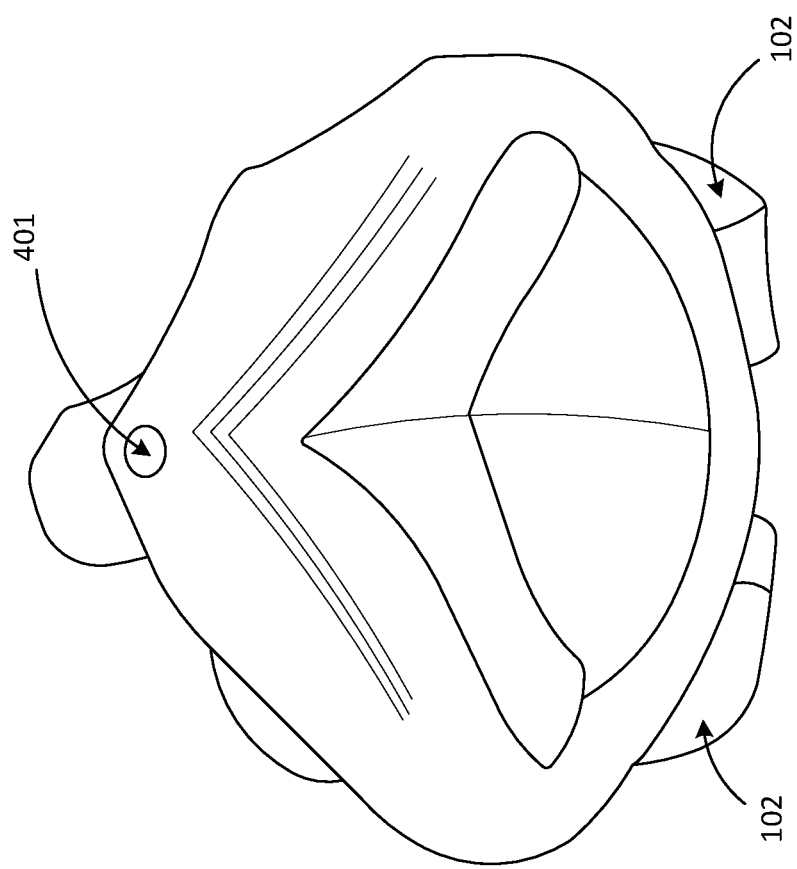
FIG. 4 is a back view of an embodiment of the polymer exterior of the decoy.
Figure 5:
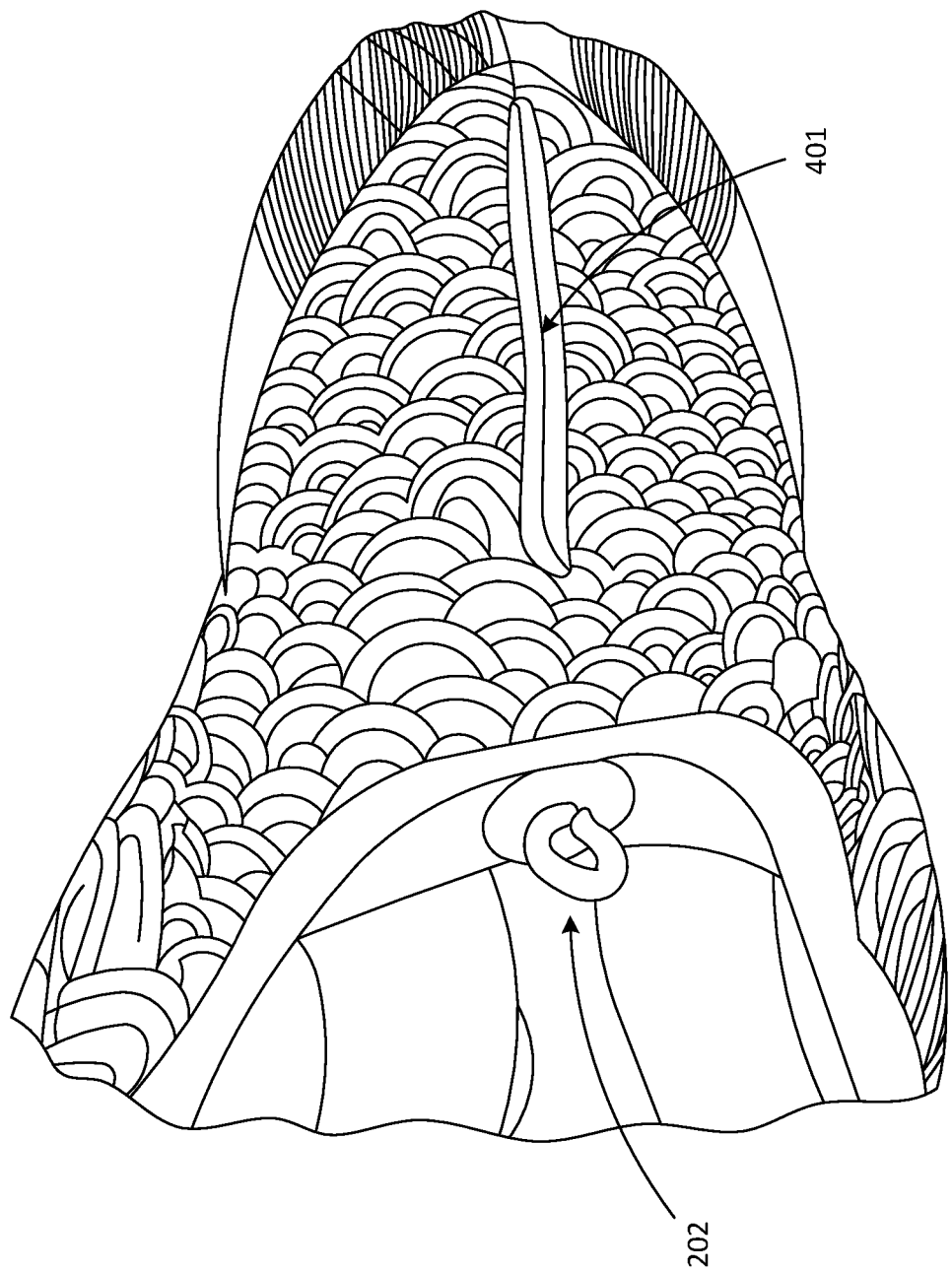
FIG. 5 is a bottom view of an embodiment of a decoy.

In certain embodiments, the cavity 201 within the decoy can become air tight when resting on the surface of the water, risking a vacuum. In these embodiments as shown in FIG. 4 a vent hole 401 can added to the aft portion of the decoy, preferably after the molding process. The small venthole extends through the decoy and connects a portion of the exterior surface of the decoy intended to float above the waterline with the inner cavity 201, with one purpose of the hole to allow airflow through the body of the decoy. In a certain embodiment, the vent hole 401 is placed on or about the centerline of the decoy on its rear-most point or above. In this manner, the airflow between the cavity and the environment is possible. Because of the venthole, pressure in the cavity is easily and constantly balanced with the outside pressure and no vacuum is created as the cavity within the decoy is not sealed closed upon the decoy resting on the water. This allows natural movement in the water and allows easier handling of the decoy when removing the decoy from water. A small venthole allows the certain benefits. First, the smaller the hole the less likely it is apparent any game bird. Second, some temporary pressure difference can be desirable to limit sudden drastic movements. When deployed, a portion of the hollow interior is submerged. In the event of a force that would tend to rapidly move the decoy, e.g., a sudden gust of wind tending to flip the decoy, the decoy would resist movement. The hollowed interior 201, as that space enlarges during the flip, would have an ever-decreasing internal air pressure so long as adequate supply of air is not available. This decreased internal pressure against an external ordinary atmospheric pressure would result in a net force tending the decoy to stay in place. When the vent hole is sized such that the interior volume would enlarge faster than the air pressure can equalize the pressure, this beneficial and temporary force occurs caused by the temporary differences in air pressure inside and outside the decoy. In the preferred embodiment, the venthole 401 diameter is approximately ¼". This diameter will change based on a variety of factors, including the size of the hollow interior, the size of the decoy, and the weights used. In most embodiments, a venthole 401 between ⅛" and ⅜" diameter is preferred. Within this range, the venthole 401 is small enough that there is lag between a sudden pull on the decoy and a later equalization of air pressure, tending to resist movements from sudden impulse forces.

Some embodiments of this disclosure include a lightweight construction of the exterior shell. The embodiment of FIG. 1 can have a length of approximately fifteen inches and a weight of approximately 12 ounces without weights. An optimal range for use taking into consideration the many advantages listed herein is between 10 and 14 ounces. These measurements will change based on a number of factors, but particularly based on the fact that different sized animals will be emulated by the decoys. The embodiment of the exterior shell of FIG. 1 has a material thickness of approximately 0.5 inches throughout, except in locations where opposite side converge, e.g., the "bill" or "tail" of the waterfowl decoy, or in locations particularly likely to experience high stresses, e.g., the approximately 90° transition from the bottom of the decoy to the feather-like sides.

One polymer that is particularly suited for use as an exterior is certain species of ethylene vinyl acetate (EVA), a copolymer of ethylene and vinyl acetate. Certain variants of EVA are usable in molding, are buoyant, resilient, UV resistant, adequately elastic, non-brittle, quiet on impact, resistant to water, heat, ozone, weathering, washing agents, and made of readily available raw materials. In some embodiments, the material used is non-brittle and has sufficient elasticity to ensure that the effects of impacts and punctures are confined to the immediate area of the damage. A material will be sufficiently non-brittle for the embodiments herein if it has a Young's modulus E of less than 15 kpsi. A material will be sufficiently elastic if it allows for deformation before failure, and is appropriate for the embodiments herein if it allows for at least 25% elongation at yield and 100% elongation at break. The material properties are properly evaluated at standard temperature and pressure. A variety of materials having one or more similar material properties to the EVA described above can also be suitable for certain embodiments. In certain embodiments various materials are used, including EVA and EPDM (ethylene vinyl acetate copolymer), which can comprise polyolefin elastomers, talc, stearic acid, zinc stearate, zinc oxide, DCP (dicumyl peroxide), titanium peroxide, and azodicarbonamide.

The exterior surface, including EVA can be treated or subjected to material that adheres color to allow more realistic looking decoys. In some embodiments, real or synthetic feathers can be attached to increase the realistic appearance of the decoy.

The EVA described herein appropriate for use with decoys has other uses. This EVA is beneficial for use in a variety of floating applications, including as a cover for boat hulls, personal floatation devices, recreational watercraft, personal cushioning like bed mats, dog mats, knee pads, and seat cushions. Many of the same benefits to waterfowl decoys are applicable to the other uses, including light-weight and non-watertight construction, durability, resiliency, and resistance to the elements traditionally associated with open-water use, e.g., intense sunlight, rough usage, impacts, and constant wetness.

Certain aspects of this disclosure include a resilient waterfowl decoy comprising: a molded body with an upper side and a lower side, having an interior cavity, the molded body constructed from a non-brittle copolymer; two keels attached to the lower side of the body, each adapted to receive a weight; two weights each sized and shaped to be received by one of the two keels; and a vent port oriented to allow the passage of air from the interior cavity through the molded body.

Certain aspects of this disclosure include the resilient waterfowl decoy above wherein the copolymer is EVA.

Certain aspects of this disclosure include the resilient waterfowl decoy above wherein the copolymer has a Young's modulus E of less than 15 kpsi.

Certain aspects of this disclosure include the resilient waterfowl decoy above wherein: each of the two keels further comprise a cavity shaped to receive a weight; each of the two weights are shaped to fit within a cavity; each of the two keels and each of the two weights are adapted for a fastener to secure the weight to the keel.

Certain aspects of this disclosure include the resilient waterfowl decoy above wherein each of the two keels are convex and the waterfowl decoy further comprises an anchor point, the anchor point being a metal grommet.

Certain aspects of this disclosure include the resilient waterfowl decoy above wherein the interior cavity is vented by a venthole of smaller than ⅜" diameter.

Certain aspects of this disclosure include the resilient waterfowl decoy above wherein each of the weights weighs between 3 ounces and 8 ounces, and the molded body weighs between 10 ounces and 14 ounces.

Certain aspects of this disclosure include the resilient waterfowl decoy above wherein each of the two keels is convex.

Certain aspects of this disclosure include the resilient waterfowl decoy above wherein the copolymer has a 25% or greater elongation at yield and 100% or greater elongation at break at standard temperature and pressure.

Certain aspects of this disclosure include the resilient waterfowl decoy above wherein, while the decoy is oriented in water with the keels extending downward, the center of gravity is ¼ inch to 2 inches above the center of buoyancy.

Certain aspects of this disclosure include a decoy comprising a body constructed from material buoyant in water, the decoy having a plurality of weighted keels and an interior vented cavity, the cavity vented by a hole with a diameter between ⅛" and ⅜".

Certain aspects of this disclosure include the decoy above wherein the material is a non-brittle copolymer that has a 25% or greater elongation at yield and 100% or greater elongation at break at standard temperature and pressure.

Certain aspects of this disclosure include the decoy above wherein the body has the appearance of a waterfowl; and each of the plurality of keels are weighted with weights totaling between 3 ounces and 8 ounces.

Certain aspects of this disclosure include the decoy above wherein the decoy has an upright position, such position being as the decoy is at rest oriented to mimic an animal in the water, further: while the decoy is placed in the upright position, the center of gravity and the center of buoyancy in water are within ¼ inch to 2 inches vertically of each other.

Certain aspects of this disclosure include the decoy above wherein each of the two keels are located such that when the decoy is upright in water of sufficient depth, the keels are submerged at least ½ inch.

Certain aspects of this disclosure include the decoy above further comprising a waterline, the waterline being a line extending around the decoy at the lowest point above water as the decoy floats in an upright position in water, wherein the decoy the cavity is vented by a hole oriented from the cavity through the body to a point above the waterline.

Certain aspects of this disclosure include a method of making a decoy comprising: creating a three dimensional computer aided design of a waterfowl decoy wherein the three dimensional computer aided design of the waterfowl decoy comprises a molded body with an upper side and a lower side, having an interior cavity, the molded body constructed from a non-brittle copolymer and two keels attached to the lower side of the body, each adapted to receive a weight; translating the three dimensional computer aided design of the waterfowl onto a mold, the mold comprising a plurality of mold sections; injecting a copolymer into the mold; and cooling the mold; adding weight to each of the two keels; and inserting a vent port through the three dimensional computer aided design of the waterfowl decoy.

Certain aspects of this disclosure include the method above, wherein the copolymer is EVA.

Certain aspects of this disclosure include the method above, wherein the two keels are convex and are no less than three inches apart at their most distant point.

Certain aspects of this disclosure include the method above, wherein adding weight to each of the two keels makes the center of gravity and the center of buoyancy in water within ¼ inch to 2 inches vertically of each other.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category.

What is claimed is:
1. A resilient waterfowl decoy comprising:
a molded body constructed from a polymer that is buoyant in water comprising an upper side and a lower side, a fore side and an aft side, a centerline bisecting the fore side and the aft side, and an outer surface and an inner surface, the inner surface forming an interior cavity;

the molded body comprising a first keel and a second keel forming a unitary one-piece structure, wherein the first keel and the second keel extend from the lower side of the molded body and are symmetrical about the centerline;

a first non-closeable opening to the interior cavity symmetrical about the centerline, disposed between the first keel and the second keel on the lower side, and extending substantially between the fore side and the aft side, configured to form an airtight seal with a water surface when the decoy is floating on water; and a second opening to the interior cavity symmetrical about the center line and configured to allow air to pass in and out of the interior cavity through the molded body when the decoy is floating on water, wherein the second opening is disposed on the lower side.

2. The resilient waterfowl decoy of claim 1, wherein the molded body is formed from a buoyant polymer.

3. The resilient waterfowl decoy of claim 2, wherein the buoyant polymer is ethylene vinyl acetate (EVA).

4. The resilient waterfowl decoy of claim 2, wherein the buoyant polymer has a 25 percent (%) or greater elongation at yield and 100% or greater elongation at break at standard temperature and pressure.

5. The resilient waterfowl decoy of claim 1, wherein the first keel and the second keel are each configured to receive a weight and house it within the unitary one-piece structure.

6. The resilient waterfowl decoy of claim 5, wherein the weight is attached to the unitary one-piece structure by a respective fastener.

7. The resilient waterfowl decoy of claim 1, wherein the first keel and the second keel each include a weight disposed therein.

8. The resilient waterfowl decoy of claim 1, wherein at least one of the first and second keels comprise a recessed slot configured to house one or more weights.

9. The resilient waterfowl decoy of claim 1, further comprising a metal anchor point on the lower side of the body.

10. The resilient waterfowl decoy of claim 1, wherein the second opening is disposed on the aft side of the molded body.

11. The resilient waterfowl decoy of claim 1, wherein the second opening comprises a diameter between approximately 1/8" and 3/8".

12. The resilient waterfowl decoy of claim 7, wherein each of the weights weighs between 3 ounces and 8 ounces, and wherein the molded body weighs between 10 ounces and 14 ounces.

13. The resilient waterfowl decoy of claim 1, wherein each of the first and second keels are convex.

14. A decoy comprising:
a body constructed from a polymer that is buoyant in water the body comprising a centerline, an inner surface forming an interior cavity, a fore side, an aft side, and a first non-closeable opening to the interior cavity on a bottom portion of the body symmetrical about the centerline extending substantially between the fore side and the aft side;

first and second keels on the bottom portion of the body and integrally formed to the body as part of a unitary, one-piece structure, wherein the first and second keels are substantially mirrored across the centerline of the body;

a second opening to the interior cavity symmetrical about the centerline wherein the second opening is disposed on the bottom portion; and at least one anchor point along the centerline of the body;

wherein the first and second keels comprise a recess configured to house one or more weights;

wherein the first non-closeable opening is configured to form an airtight seal with a water surface when the decoy is floating on water; and wherein the second opening is configured to allow air to pass in and out of the interior cavity through the body when the decoy is floating on water.

15. The decoy of claim 14, wherein the buoyant polymer has a 25 percent (%) or greater elongation at yield and 100% or greater elongation at break at standard temperature and pressure.

16. The decoy of claim 14, wherein the body comprises an upper side and a lower side, the centerline bisecting the fore side and the aft side, and an outer surface.

17. The decoy of claim 14 wherein the body comprises a center of gravity and a center of buoyancy in water that are within 1/4 inch to 2 inches of each other vertically.

18. The decoy of claim 14, wherein each of the first and second keels are at least partially submerged when the decoy is in the water.

19. The decoy of claim 16, further comprising:
the first non-closeable opening to the interior cavity disposed between the first keel and the second keel configured to form an airtight seal with a water surface when the decoy is floating on water; and the second opening to the interior cavity configured to allow air to pass in and out of the interior cavity through the body when the decoy is floating on water.

20. The decoy of claim 14, wherein each keel and respective weight are attached to one another by a respective fastener.

* * * * *